United States Patent [19]

Broughton

[11] Patent Number: 5,497,969
[45] Date of Patent: Mar. 12, 1996

[54] RELEASABLE LOCKING APPARATUS

[76] Inventor: John Broughton, P.O. Box 520, Crows Nest, Australia, 2065

[21] Appl. No.: 338,453

[22] PCT Filed: May 25, 1993

[86] PCT No.: PCT/AU93/00249

§ 371 Date: Nov. 16, 1994

§ 102(e) Date: Nov. 16, 1994

[87] PCT Pub. No.: WO93/24350

PCT Pub. Date: Dec. 9, 1993

[30] Foreign Application Priority Data

May 27, 1992 [AU] Australia .................... PL2685

[51] Int. Cl.$^6$ ........................................ A47F 5/00
[52] U.S. Cl. ........................................ 248/352; 280/763.1
[58] Field of Search .................... 248/352, 351, 248/688, 354.1, 357, 164; 280/763.1, 765.1

[56] References Cited

U.S. PATENT DOCUMENTS

| | | | |
|---|---|---|---|
| 2,162,181 | 6/1939 | Skinner | 248/357 X |
| 2,571,390 | 10/1951 | Strand | 248/357 X |
| 3,695,631 | 10/1972 | Schwaiger | 280/507 |
| 3,791,676 | 2/1974 | Spratlen | 280/763.1 X |
| 3,857,575 | 12/1974 | Lee | 248/351 X |
| 4,469,348 | 9/1984 | Crook | 280/763.1 X |
| 4,589,632 | 5/1986 | Smith | 280/765.1 X |
| 4,993,677 | 2/1991 | Patterson | 248/352 X |
| 5,094,423 | 3/1992 | Almquist | 248/352 X |
| 5,358,204 | 10/1994 | Terada | 248/164 |

FOREIGN PATENT DOCUMENTS

| | | | |
|---|---|---|---|
| 204857 | 5/1956 | Australia . | |
| 244218 | 11/1962 | Australia . | |
| 293397 | 2/1968 | Australia . | |
| 23618/70 | 6/1972 | Australia . | |
| 85651 | 4/1977 | Australia | B62D 63/08 |
| 49466 | 2/1980 | Australia | B60S 9/04 |
| 339827 | 12/1985 | Australia | B60S 9/22 |
| 61043/90 | 9/1992 | Australia | B60S 9/004 |
| 24540 | 2/1993 | Australia | B60S 9/04 |
| 2626327 | 7/1989 | France | F16B 12/10 |
| 222403 | 10/1942 | Switzerland | 280/763.1 |
| 2248431 | 4/1992 | United Kingdom | B60R 25/00 |
| 8201855 | 6/1982 | WIPO | B60S 9/04 |

*Primary Examiner*—J. Franklin Foss
*Attorney, Agent, or Firm*—Michael D. Bednarek; Marks & Murase

[57] ABSTRACT

Releasable locking apparatus for locking together adjacent elongated members such as a support post (10) and a drawbar (16) of a vehicle. In one arrangement, first and second mountings in the form of saddles (20 and 28) are adapted to saddle respective elongated support post and drawbar for non-rotational connection thereto. The saddles are connected to respective support post and towbar by a common pin (21) about which they may rotate when disconnected. Overlapped portions (23 and 29) of the saddles abut to provide a non-rotational connection. Releasable security type locking means attached to pin aperture (25) restrains axial movement along the pin. The support post is movable and releasably lockable from a vertically extending support position to a stowed position extending alongside the drawbar.

10 Claims, 5 Drawing Sheets

RELEASABLE LOCKING APPARATUS

TECHNICAL FIELD

This invention relates to releasable locking apparatus for locking adjacent elongate members together.

The invention has particular but not exclusive application to supporting the drawbar of a motor vehicle trailer in an elevated attitude and particular reference will be made hereinafter to such application. However, the invention also relates to drawbars for towing many types of apparatus. For example, it could be utilized to elevate a boat, a caravan, agricultural or earthmoving equipment.

BACKGROUND ART

A major problem with trailers is that they can be stolen or used by unauthorized persons relatively easily by simply hitching the trailer to a vehicle and driving away. Various devices have been proposed to prevent this theft and unauthorized use such as wheel locking and hitch cover devices. However, many of these known devices are ineffective and are also cumbersome in that they involve storing various loose components of the device, such as chains, covers and fasteners in a garage or in a car boot when the device is not in use. Others are expensive and inefficient in use.

DISCLOSURE OF THE INVENTION

The present invention aims to alleviate at least one of the abovementioned disadvantages and to provide a useful alternative releasable locking apparatus which will be reliable and efficient in use. Other objects and advantages of this invention will hereinafter become apparent.

With the foregoing and other objects in view, this invention in one aspect resides broadly in a releasable locking apparatus for locking adjacent elongate members together and including:
- a first mounting non-rotatably connectable to a first elongate member;
- a second mounting non-rotatably connectable to a second elongate member; and
- interconnection means which interlocks the first and second members when the mountings are operatively connected to the respective elongate members.

Preferably the first and second mountings are saddle like members adapted to saddle respective elongate members for non-rotational connection thereto. One of the mountings/saddle members may be adapted to extend beyond the elongate member to which it is connectable for non-rotational engagement with the other mounting/saddle.

One of the mountings/saddle members may be adapted for non-rotatable engagement with the other mounting/saddle member at a plurality of positions whereby the elongate members may be locked to one another at selected angles and complementary engagement means, such as teeth, may be provided on each mounting providing adjustable interlocking.

The saddles or mountings may be adapted to be connected to respective elongate members by a common pin about which they may rotate when disconnected. Preferably the interconnection means is constituted by the pin, prevention of axial separation of the saddles along the pin and overlapped portions of the saddles which abut to provide a non-rotational connection. The pin and saddles may be restrained from axial movement by releasable locking means attached to one end of the pin. The locking means is preferably of the security type, for example, operated by a key, a magnetic card or a combination lock.

In a preferred arrangement one member is a drawbar and the other member is a support post. The support post may include a plurality of longitudinally spaced apertures therethrough and through which the pin may selectively extend so that the drawbar can be positioned at any convenient and effective height from the ground. In particular, it may be desirable to raise the level of the drawbar connection so that it is too high for effective coupling with a conventional drawbar connection located at the rear of a vehicle. Preferably the support post includes a ground engaging portion provided with a skid plate, however other suitable ground engaging means may be provided such as a member, designed to hinder forward travel and/or to provide support.

In one arrangement the support post is movable from a support position to a stowed position extending alongside the drawbar.

The saddles may be provided with spacer means to allow for different sized elongated members. In the support post/drawbar arrangement the spacer is preferably located between a drawbar saddle leg and the drawbar. The spacer means may be fixedly attached to the saddle.

Of course, the various components of the apparatus may be formed of any convenient section of material, and may depend upon the cross section of the elongate members. The components may be adjustable to accommodate various shapes and sizes of drawbars. In a preferred embodiment the major components are formed of galvanised steel. However, any suitable material may be used to suit, for example, corrosion resistance, strength or fabrication requirements.

DESCRIPTION OF PREFERRED EMBODIMENT

In order that this invention may be more readily understood and put into practical effect, reference will now be made to the accompanying drawings which illustrate a preferred embodiment of the releasable locking apparatus of this invention, wherein.

Figure 1:
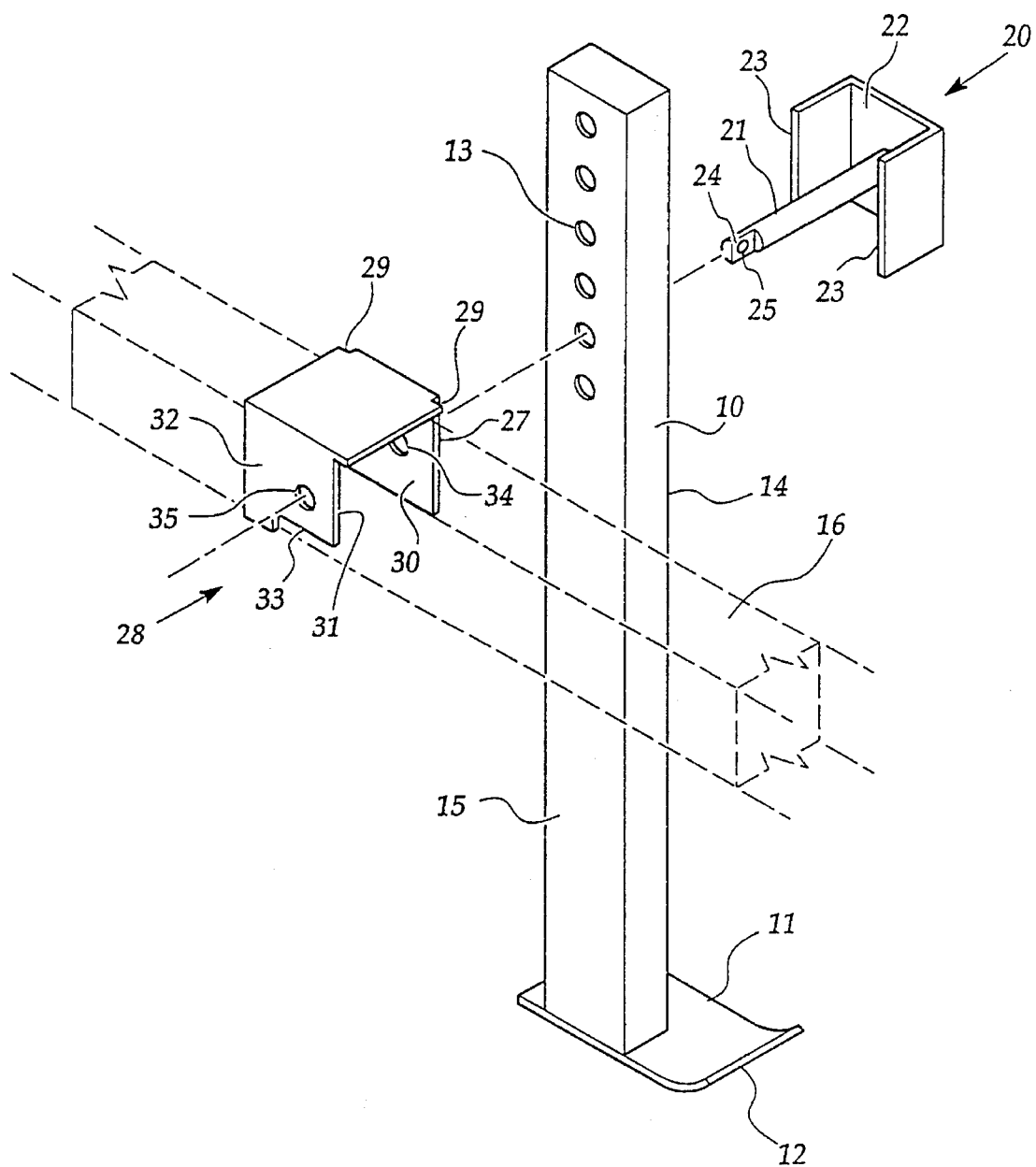
FIG. 1 is an exploded view of a releasable locking apparatus for locking an adjacent vehicle drawbar and its support post together.
Figure 2:
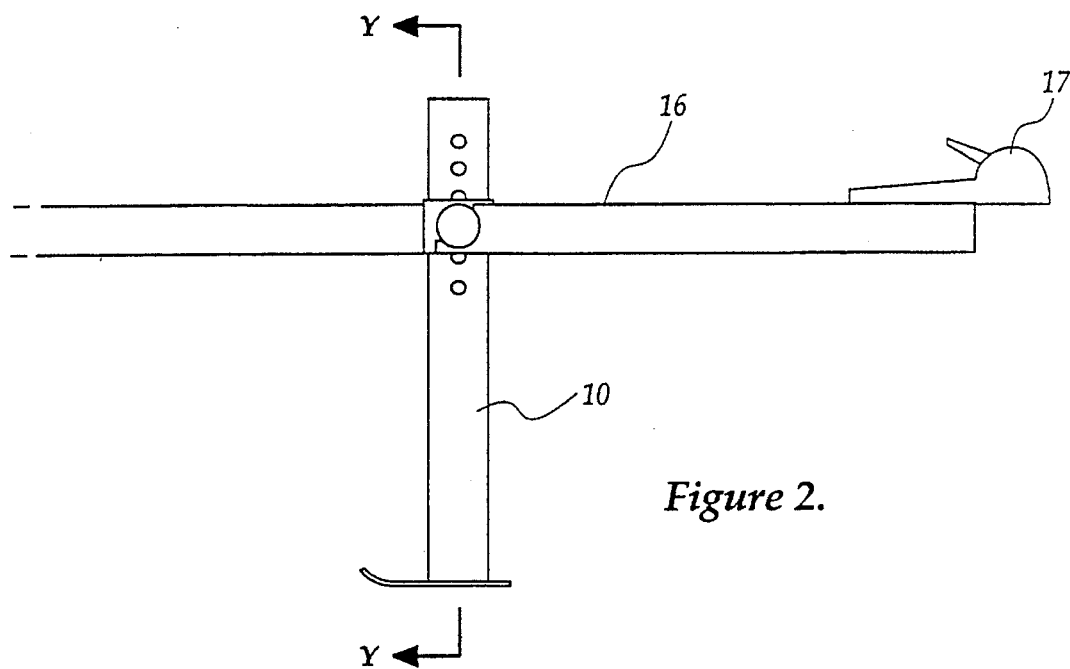
FIG. 2 illustrates the drawbar and support post in the support mode.

The releasable locking apparatus illustrated in FIG. 1 includes a box section support post 10 provided with a skid plate 11 at its lower end. The skid plate 11 is provided with an upturned trailing edge 12 and is offset with respect to the longitudinal axis of the post. The support post 10 is provided with vertically spaced apertures 13 located through opposing post side faces 14 and 15. As best seen in FIG. 2, a box section drawbar 16 is attached to the post 10 and supported horizontally. The drawbar is provided with a coupling member 17 at one end for attachment to a prime mover such as a motor vehicle (not shown).

Figure 4:
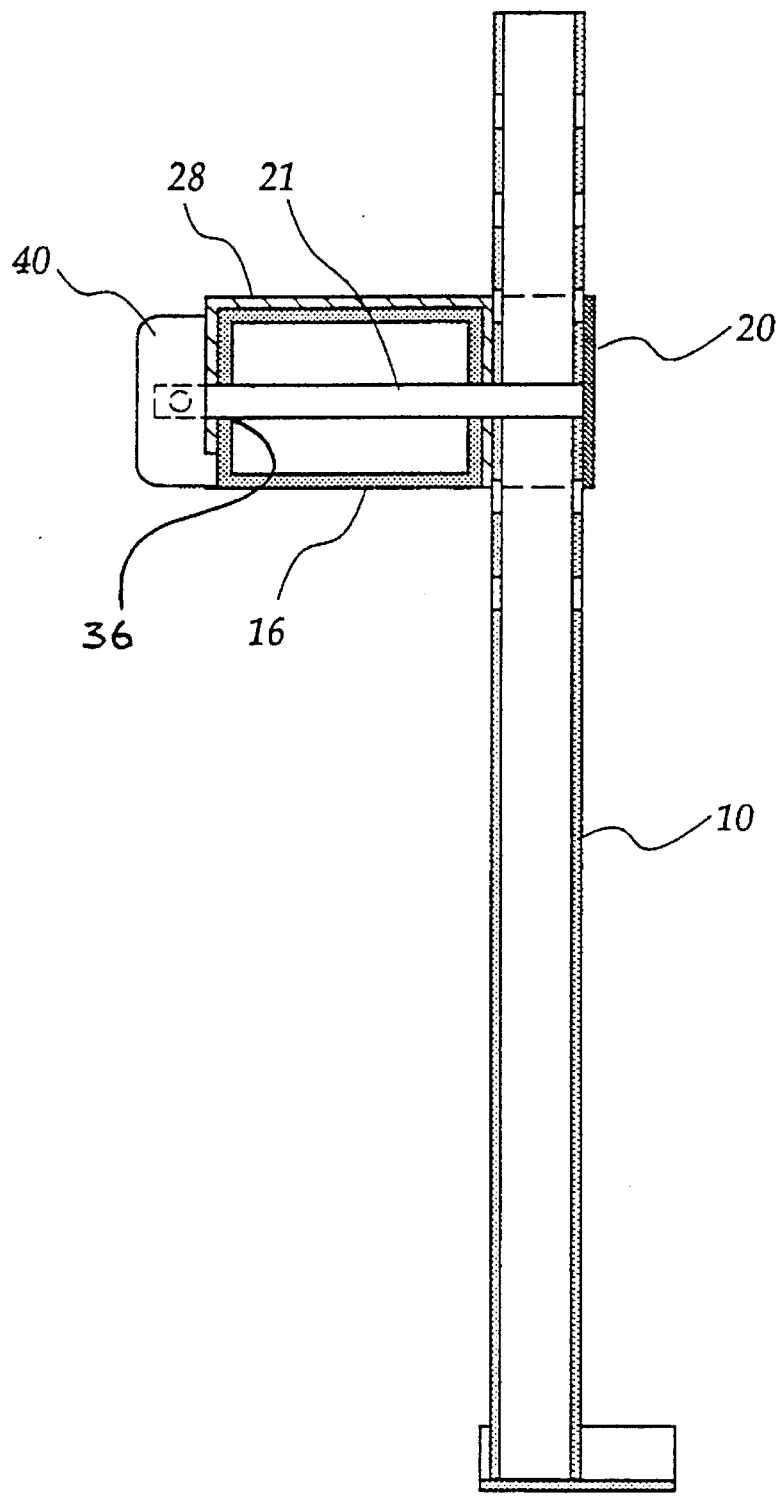
FIG. 4 is a part cross-sectional view along the lines YY of FIG. 2.

Referring to FIGS. 1 and 4, a U-shaped post saddle 20 is located on one side of the post 10. The post saddle 20 includes an innerface 22, vertical edges 23, and is provided with a horizontal pin 21 fixed to and extending from its inner face 22. The free end of the pin is provided with opposing flats 24 and a transverse bore 25. An inverted U-shaped drawbar saddle 28 is located on the other side of the leg 10 and is provided with a pair of vertical elongated cutouts 29 in depending side leg wall 30, vertical cutout 31 in depending side leg wall 32 and horizontal cutout 33 also in depending side leg wall 32. The drawbar saddle 28 is also provided with a pair of horizontal aligned apertures 34 and 35 extending through its side leg walls 30 and 32. The drawbar 16 is provided with a pair of corresponding apertures 36 in its side walls and is straddled by the drawbar saddle 28. The pin 21 extends through the apertures 13 of the support post, through the aperture 34 in the drawbar saddle side wall 30, through the apertures 36 in the drawbar and finally exits through the aperture 35 in the drawbar saddle side wall 32. Post saddle 20 straddles the post 10 and the edges 23 of the saddle sides extend beyond the post and are received in the vertical cutouts 29 provided in the side wall 30 of the drawbar saddle 28.

Figure 3:
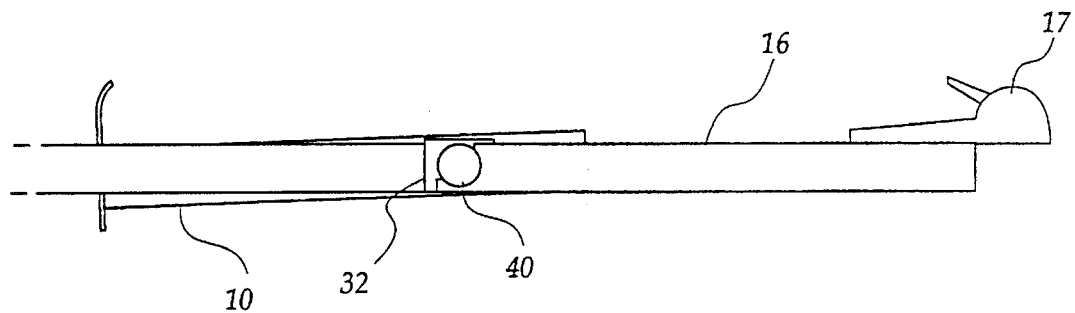
FIG. 3 illustrates the drawbar and support post in the stowed mode.
Figure 5:
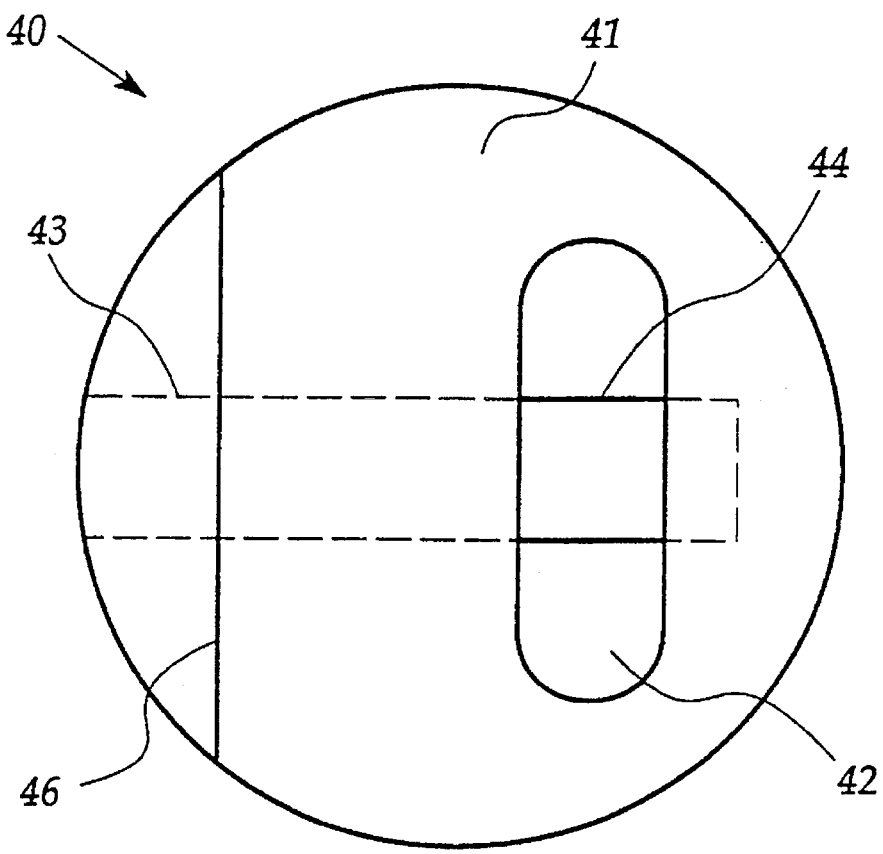
FIG. 5 is a front view of a prior art key operated locking device.
Figure 6:
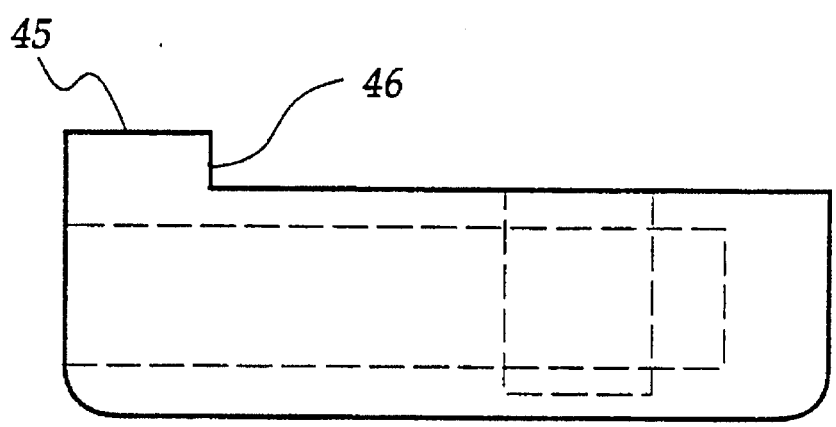
FIG. 6 is a side view of the prior art locking device of FIG. 5.

The apparatus includes a prior art key operated locking device 40 shown in FIGS. 5 and 6. This device is provided with a cylindrical body 41 having an elongated recess 42 which is adapted to receive the complementary shaped end of the pin 21. The locking device 40 is also provided with a bore 43 transverse to the elongated recess 42 and which is adapted to receive a key plunger 44 which, in the locked position, extends through transverse bore 25 in the end of pin 21 to prevent axial separation of the saddle along the pin. The lock body face 45 is cut away to provide an abutment edge 46 which registers with the cutout 31 of the drawbar saddle 28 when the post 10 is in the support position (FIG. 2) and registers with cutout 33 of the drawbar saddle 28 when the post 10 is in the stowed position (FIG. 3).

Figure 7:
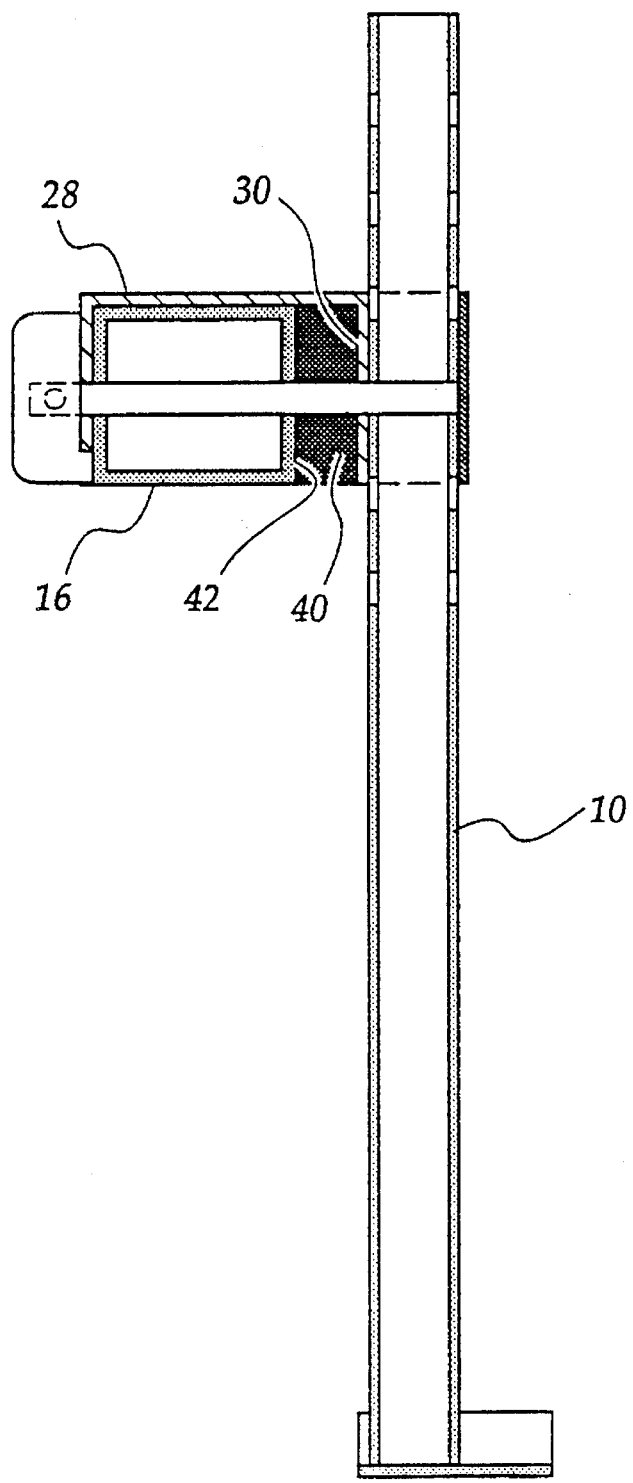
FIG. 7 is a part sectional view of a drawbar and spacer embodiment.

As shown in the embodiment of FIG. 7, the apparatus may include a spacer 40 positioned between drawbar saddle leg inner wall 30 and outer face 42 of the drawbar 16. This provides for different widths of drawbar and also increases the space between the drawbar 16 and support post 10.

In order to install the locking apparatus, a pair of apertures 36 are drilled through the box section drawbar 16 to accommodate the pin 21. The drawbar saddle 28 is positioned on the drawbar with the pair of drawbar saddle apertures 34 and 35 being aligned with the pair of drawbar apertures. The pin 21 of the post saddle 20 is fed through a convenient pair of height adjustment apertures 13 in the post 10, and then fed through the aligned apertures in the drawbar saddle and drawbar until the face 15 of the post abuts face 27 of the drawbar saddle 28 and the vertical edges 23 of the post saddle 20 extend beyond the post and engage within the vertical recesses 29 in the drawbar saddle 28. Lock 40 is then fed onto the end of the pin 21 ensuring that abutment edge 46 fits into cutout 31 of drawbar saddle 28. The plunger 44 is then pushed upwards to extend through transverse bore 25 in the pin end and locked into place with the key. Thus axial movement of the pin and saddles are prevented.

When installed, vertical relative movement between the post 10 and the drawbar 16 is prevented by the pin 21, axial movement is prevented by locking device 40 and angular relative movement between the two saddles is prevented by the engagement of the vertical edges 23 of the post saddle with the vertical recesses 29 in the drawbar saddle.

Provided that the drawbar is supported at a sufficient height off the ground, any attempt to tow or maneuver the trailer will prove to be extremely difficult, if not impossible.

When it is desired to tow the trailer the locking device 40 is unlocked with a key and the pin 21 and post saddle 20 are withdrawn axially a short distance to disengage the vertical edges 23 of the post saddle from the vertical recesses 27 in the drawbar saddle. The post leg 10 and the post saddle are then rotated from the vertical support position, to the horizontal stowed position (FIG. 3) alongside the drawbar 16, and the pin and support post saddle 20 are returned axially the short distance ensuring that the ends 23 of the post saddle engage over the bottom edge and top edge of the drawbar saddle wall 30 to prevent angular movement between the saddles. The lock 40 is then replaced onto the end of the pin 21 ensuring that abutment 46 fits into cutout 33 of drawbar saddle bracket 28.

Thus the releasable locking apparatus of this embodiment is compact and of rigid construction. It is particularly simple to attach the apparatus to a drawbar or other elongated member. The components of the apparatus are readily available for use because they remain with the trailer when in the stowed position and dispense with the need of some prior art devices to search for loose components when it is desired to use the apparatus.

It will of course be realised that whilst the above has been given by way of an illustrative example of this invention, all such and other modifications and variations hereto, as would be apparent to persons skilled in the art, are deemed to fall within the broad scope and ambit of this invention as is defined in the appended claims.

I claim:

1. A support assembly for an apparatus having a drawbar, said support assembly comprising:

a support post for supporting said drawbar in an elevated position, said support post having a plurality of apertures whereby the drawbar may be supported at a selected elevation;

support post mounting means non-rotatably connectable to said support post;

drawbar mounting means non-rotatably connectable to said drawbar; and interconnection means receivable within a support post aperture for interconnecting and releasably locking together said support post and said drawbar;

said support post mounting means and said drawbar mounting means interengaging when said support post and said drawbar are locked to prevent rotational movement therebetween.

2. A support assembly according to claim 1, wherein said support post mounting means and said drawbar mounting means are saddle-like members which saddle said support post and said drawbar, respectively, for non-rotational connection thereto.

3. A support assembly as claimed in claim 2, wherein a respective one of said mounting means extends beyond said support post or said drawbar to which it is connectable for non-rotational engagement with the other mounting means.

4. A support assembly as claimed in claim 3, wherein one of said mounting means is adapted for non-rotatable engagement with the other mounting means at a plurality of positions whereby said support post and said drawbar may be locked to one another at selected angles.

5. A support assembly as claimed in claim 4, wherein complementary engagement means are provided on each mounting means to facilitate said selected angle positioning.

6. A support assembly as claimed in claim 3, wherein said interconnection means is a pin affixed to one of said mounting means and lockable to the other mounting means thereby preventing axial separation of the overlapped portions of the mounting means to thereby effect said non-rotational engagement.

7. A support assembly as claimed in claim 6, including releasable locking means adapted to restrain axial movement along the pin when said mounting means are interconnected and locked.

8. A support assembly as claimed in claim 3, wherein the support post includes a ground engaging portion.

9. A support assembly as claimed in claim 8, wherein the support post is movable and releasably lockable from a support position to a stowed position extending generally alongside the drawbar.

10. A support assembly as claimed in claim 3, wherein at least one of said mounting means is provided with spacer means to allow for different sized support posts and drawbars, respectively.

* * * * *